United States Patent [19]

Gauer et al.

[11] Patent Number: 4,735,511

[45] Date of Patent: Apr. 5, 1988

[54] TEMPERATURE SENSING DEVICE FOR THIN-WALLED THERMOPLASTIC PRESSURE VESSELS

[75] Inventors: Gary W. Gauer, Cottage Grove; William M. Yavorsky, Woodbury, both of Minn.

[73] Assignee: Ecodyne Corporation, St. Paul, Minn.

[21] Appl. No.: 925,284

[22] Filed: Oct. 31, 1986

[51] Int. Cl.$^4$ .......................... G01K 1/14; A47J 27/00
[52] U.S. Cl. ...................... 374/141; 99/343; 126/388
[58] Field of Search ........................ 374/141; 116/220; 126/388; 99/343

[56] References Cited

U.S. PATENT DOCUMENTS

| | | | |
|---|---|---|---|
| 2,712,295 | 7/1955 | Haynes | 126/388 X |
| 3,117,550 | 1/1964 | Cole | 116/220 |
| 4,418,637 | 12/1983 | Heermans | 126/388 X |
| 4,509,868 | 4/1985 | Ronconi et al. | 374/141 |
| 4,541,733 | 9/1985 | Andre | 126/388 X |

Primary Examiner—Daniel M. Yasich
Attorney, Agent, or Firm—Neuman, Williams, Anderson & Olson

[57] ABSTRACT

A temperature sensing device for a thin-walled pressure vessel is provided. This device comprises an insert segment which lies inside the pressure vessel in heat exchange relation with the fluids contained by the vessel, an outer segment disposed outside of the pressure vessel, a linking segment normally disposed in a port through the side wall of the pressure vessel for connecting the outer segment with the insert segment, and a temperature sensing device connected to the outer segment. The device also includes an o-ring disposed around the linking portion and forming a seal between the linking portion and the sidewalls of the port.

4 Claims, 1 Drawing Sheet

TEMPERATURE SENSING DEVICE FOR THIN-WALLED THERMOPLASTIC PRESSURE VESSELS

BACKGROUND OF THE INVENTION

1. Field of the Invention

The present invention relates to a temperature sensing device for thin-walled thermoplastic pressure vessels used to contain fluids at high pressures and temperatures. More particularly, the invention relates to a device which provides a highly conductive thermal path between the contents of a thin-walled pressure vessel and the outside of the vessel. It allows temperature sensing, measuring and control devices to make temperature readings of the contents of a thin-walled thermoplastic pressure vessels from outside of the vessel and to quickly detect temperature changes.

2. Description of the Prior Art

Most prior art pressure vessels used to contain fluids at high pressures and temperatures are metal structures. Since metal is an excellent conductor of heat, the temperature of the outer surface of the pressure vessel corresponds to the temperature of the vessel's contents. Therefore, temperature sensing and control devices for these prior art pressure vessels typically make temperature readings by placing sensors directly in contact with the outer wall surface of the vessel.

However, recently, manufacturers of pressure vessels have begun to market an increasing number of non-metallic, thin-walled pressure vessels. These pressure vessels have composite outer shells of continuously wound glass filaments impregnated with a thermosetting resin material and inner liners made out of plastic material. Their side walls are relatively thin and light making them easy to handle and construct.

Although the vessels have relatively thin side walls, the materials used to construct them are poor conductors of heat. Consequently, it requires a long period of time before the temperature of the outer wall surface corresponds to the temperature of the vessel's contents, i.e., the temperature of the vessel's wall does not respond quickly or dynamically to changes in the temperature of the vessel's contents. Therefore, the conventional approach of placing a temperature sensing device directly upon the vessel sidewall does not provide an accurate measure of the vessel's contents. In addition, since the vessel is made of a thermoplastic material, it does not allow easy attachment of temperature sensing devices to its walls.

Attempting to modify the sidewalls of these thin-walled pressure vessels to include a metal portion through which temperature sensing may take place presents significant problems. Metal has a coefficient of thermal expansion different than that of the material used to construct these thin-walled pressure vessels. Thus, the metal portion would expand and contract a different rates, separating from the remaining side wall and resulting in leaks or structural damage. The inventions described in co-pending applications: Ser. No. 822,921, entitled "Pressure Vessel with an Improved Sidewall Structure", and filed on Jan. 24, 1986 (now U.S. Pat. No. 4,619,374); Ser. No. 885,300, entitled "A Pressure Vessel with an Improved Sidewall Structure" and filed July 14, 1986; and Ser. No. 885,299, entitled "Method of Manufacturing a Pressure Vessel with an Improved Sidewall Structure" and filed July 14, 1986, all assigned to the assignee of the present application, have overcome these specific problems.

The temperature sensing device of the present invention avoids these problems and allows quick and efficient sensing of the temperature of the pressure vessel's contents. Moreover, it does not contact directly the outer surface of the sidewalls of a thin-walled pressure vessel, thereby avoiding any problems of attachment.

The temperature sensing device of the present invention responds quickly to temperature changes of the contents within a thin-walled pressure vessel. It comprises a member of high thermal conductivity, including an insert segment for placing into a pressure vessel through a port in the shell of the pressure vessel to make contact with the fluid in the vessel, a linking segment disposed in the port of the pressure vessel and an outer plate segment disposed outside of the pressure vessel. Temperature sensing and control devices mounted directly on this outer plate segment take temperature readings of the plate, and accordingly of the vessel's contents.

SUMMARY OF THE INVENTION

It is a general object of this invention to provide a temperature sensing device for a thin-walled plastic pressure vessel which responds quickly to temperature changes in the vessel.

It is another object of the present invention to provide a temperature sensing device which facilitates temperature sensing of a thin-walled plastic pressure vessel's contents without relying on the temperature at the outer surface of the pressure vessel.

It is another object of this invention to provide a temperature sensing device with a construction which minimizes the expense of manufacture and assembly and gives reliable performance.

Other objects, advantages and features of the present invention will become apparent upon reading the following detailed description and claims, and upon reference to the accompanying drawings.

In the preferred embodiment of the present invention, a temperature sensing device allows temperature sensing of the contents of a thin-walled plastic pressure vessel, a vessel such as one constructed from a shell made from a thermoplastic inner liner and an outer layer of glass filaments bound by a resinous material. The device provides communication between the inside and outside of the vessel through a port in the sidewall of the vessel so that a user may sense the temperature of the fluids contained in the vessel by taking the temperature of the device outside of the pressure vessel. Due to its high thermal conductivity, the device responds quickly to temperature changes in the pressure vessel.

The device includes an insert segment whose size and configuration allows the user to place it through the port in the vessel sidewall and into the vessel. There, the insert segment makes heat exchange contact with the fluids contained by the vessel. The insert segment is made from a material of high thermal conductivity. Industrial metals, such as copper, are suitable for forming it. An outer plate segment lies outside of the pressure vessel, and a linking segment connects the insert segment and outer plate segment. These two other segments are made from material such as the material of the insert segment. The linking segment normally lies within a port through the pressure vessel sidewall. Temperature sensing and/or control devices connected directly to the outer plate segment measure the outer plate segment temperature which corresponds to the temperature of the vessel's contents.

A flexible o-ring disposed around the linking segment forms a seal between the linking segment and the fitting of the vessel's port. It prevents leakage through this space. The diameter of the o-ring is greater than the space between the linking portion and the fitting of the port; therefore, the o-ring lies in compression between the linking portion and the fitting to form the leak-proof seal.

In the preferred embodiment, the outer plate segment is a flat plate with an opening formed through it. A tube disposed generally perpendicular to the outer segment and secured at one end to the walls of its opening forms the insert segment and the linking segment. The opening which extends through the tube coincides with the opening in the outer segment. When the user inserts the tube into the pressure vessel, the opening through the tube becomes the port for the vessel.

As described above, the device has generally an L-shaped configuration. However, it may have any one of a wide variety of configurations. In addition, a solid bar may replace the tube and act as a plug through the vessel's port.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following text will describe the invention in connection with a preferred embodiment, one should understand that the invention is not limited to this embodiment. Furthermore, the drawings are not to scale. In certain instances, the applicant may have omitted details which are not necessary for the understanding of the present invention.

DETAILED DESCRIPTION OF THE DRAWINGS AND THE PREFERRED EMBODIMENT

Figure 3:
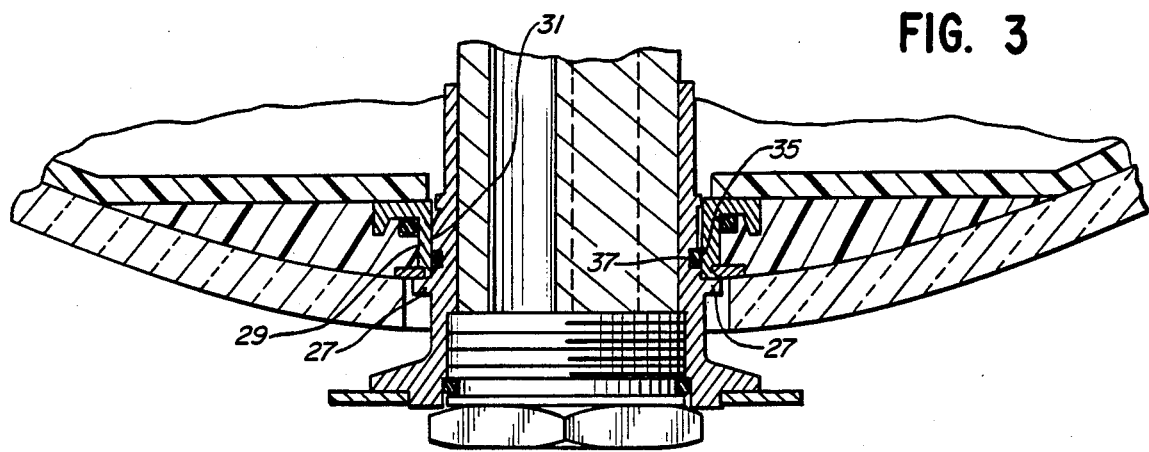
FIG. 3 is a sectional view taken along line 3—3 of FIG. 1 showing the temperature sensing device in place through a port of a thin-walled pressure vessel.
Figure 1:
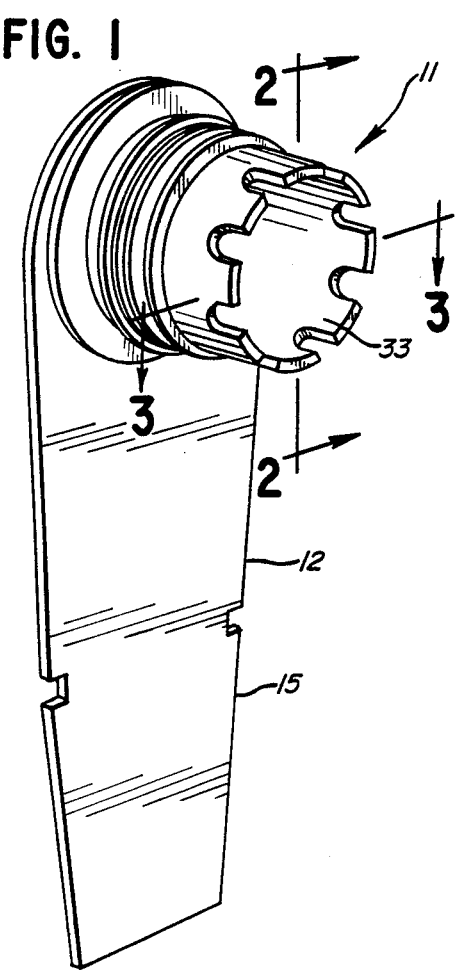
FIG. 1 is a perspective view of the temperature sensing device of the present invention.

Turning now to the drawings, FIG. 1 shows the temperature sensing device of the present invention generally at 11. This device facilitates temperature sensing of the contents of a thin-walled pressure vessel having a shell made from a thermoplastic inner liner and an outer layer of glass filaments bound by a resinous material. It provides communication between the inside and outside of the vessel through a port so that a user may sense the temperature of the fluids contained in the vessel by taking the temperature of the device outside of the vessel. In addition, due to its high thermal conductivity, it responds quickly to temperature changes in the pressure vessel, i.e. it provides a dynamic response.

The device 11 includes a member 12 made out of a metal or any other material having a high thermal conductivity. Industrial metals, such as copper, are suitable for forming this member. The member generally includes an insert segment 13, an outer segment 15 and a linking segment 17. It provides communication between the inside and outside of the vessel through an existing port in the shell of the vessel so that a user may sense the temperature of the fluids contained in the vessel by taking the temperature of the member outside of the vessel.

The outer segment 15 is a flat plate 19 which has a round opening 21 formed through it at one end. The configuration of this segment is generally rectangular, elongate and rounded at the end with the opening. However, the segment 15 may have any suitable configuration which allows mounting of temperature sensing, measuring and control devices which measure its temperature.

The linking segment 17 consists of one end of a tube 23 disposed perpendicularly to the plate 19 and secured at its distal end to the walls of opening 21 in the plate 19. At this location, a flange 25 of the tube 23 maintains the tube 23 perpendicularly to the plate 19. A second flange 27 disposed in this general area engages a fitting 29 defining a port 31 through the pressure vessel.

The opposite end of tube 23 is the insert segment 13. The user places this end of the tube 23 into the pressure vessel through the port 31. In the vessel, the insert segment 13 contacts the fluid and heat from the fluids transfers to the segment. To facilitate heat transfer, the distal end 33 of the tube 23 may have a plurality of projections cut into it.

Along with flange 27, a flexible o-ring 35 disposed around the linking portion 17 provides a seal between the linking portion and the fitting 29. This o-ring 35 lies in a seat 37 formed by the flange 27 and a projection 39 in the tube 23. Its diameter is larger than the space between the linking portion and the fitting 29; therefore, it lies between these two members in pressure contact and in compression to form a seal between them.

The tube 23 has an opening 41 which extends through it and which defines a port for the pressure vessel once the user has installed the device 11 through the port 31. This port 41 generally coincides with the opening 21 in the plate 19. The wall of the opening 41 has threading 43 formed into it for receiving a plug or other fitting. Alternatively, the tube may be a solid member without a port, and accordingly serve as a plug.

Figure 2:
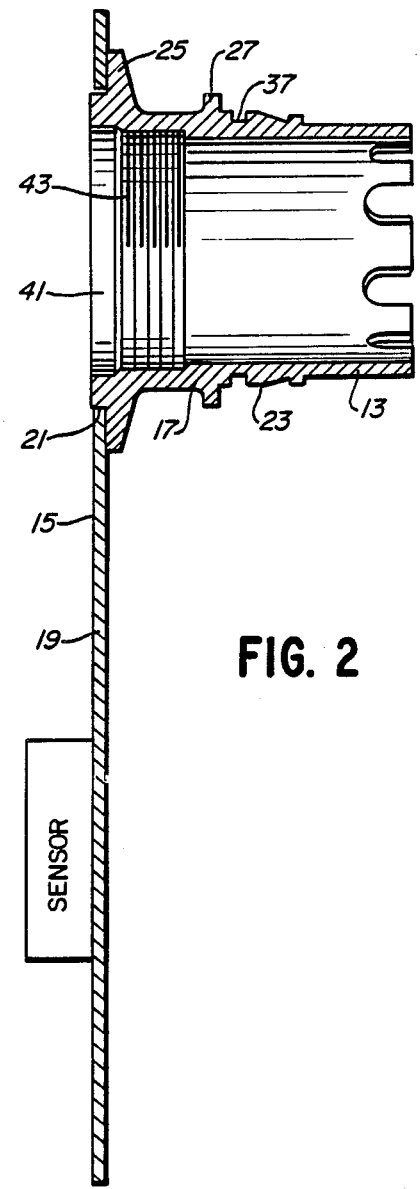
FIG. 2 is a sectional view taken along line 2—2 of FIG. 1.

To construct the temperature sensing device of the present invention, the maker of this device forms the plate 19 by cutting a sheet of suitable metal to the configuration shown in FIGS. 1 and 2. The maker then forms the opening 21 through this plate. He then secures the tube 23 to the plate 19 circumjacent the opening 21 by crimp rolling or any other suitable method, e.g., soldering or brazing, which insures intimate thermal contact between the plate 19 and the tube 23. Finally, the maker places the o-ring 35 in its seat; inserts the device in place, as shown in FIG. 2; and expands the tube 23 using a suitable tool to latch or secure the device to the fitting 29. Alernatively, the tube 23 and fitting 29 may have corresponding threaded surfaces for securing the tube 23 to the fitting 29.

In operation, the fluids in the pressure vessel heat the insert 13 which conducts the heat to the linking segment 17 and onto the outer segment 15 where sensing devices sense or measure the segment 15's temperature. The user may use any one of a wide variety of well known sensing devices.

Thus, the applicant has provided a temperature sensing device which facilitates sensing the temperature of the contents of the pressure vessel. This device includes a member having an inner insert portion for contacting the fluid disposed within the pressure vessel, an outer portion disposed outside of the pressure vessel, and a linking portion which connects the inner portion with the outer portion. It responds quickly to temperature changes of the fluids contained by the pressure vessel and allows effective monitoring of those fluids.

While the applicant has shown only one embodiment of the present invention, one will understand, of course, that the invention is not limited to this embodiment since those skilled in the art to which the invention pertains may make modifications and other embodiments of the principles of this invention, particularly upon considering the foregoing teaching. The applicant, therefore, by the appended claims, intends to cover any such modifications or other embodiments as incorporate those features which constitute the essential features of this invention.

What is claimed is:

1. A temperature sensing device for a thin-walled thermoplastic pressure vessel which contains fluids at high pressures and temperatures and which has a port through its sidewall, said sensing device comprising: an insert segment for positioning in said pressure vessel in heat exchange relation with the fluids contained in said vessel; an outer segment placed outside of said pressure vessel; a linking segment disposed within the port in the sidewall of said pressure vessel and connecting said insert and outer segments; said insert portion, said linking portion, and said outer portion being made of material having a high thermal conductivity; sealing means disposed around said linking portion for providing a leak-proof seal between said linking portion and the walls of said port through said pressure vessel; and a temperature sensory device mounted in contact with said outer segment to measure the temperature of said outer segment which corresponds to the temperature of said vessels contents.

2. A temperature sensing device as set forth in claim 1, wherein said sealing means is a flexible o-ring.

3. A temperature sensing device as set forth in claim 1, wherein said member is a one-piece, integral unit made out of metal.

4. A temperature sensing device as set forth in claim 1, wherein said linking portion defines an opening to provide a port for said pressure vessel.

* * * * *